(12) United States Patent
Fattal et al.

(10) Patent No.: US 8,270,543 B1
(45) Date of Patent: Sep. 18, 2012

(54) SCALING AND QUANTIZATION OF SOFT DECODING METRICS

(75) Inventors: Shahar Fattal, Tel Aviv (IL); Ronen Mayrench, Ra'anana (IL)

(73) Assignee: Marvell International Ltd., Hamilton (BM)

( * ) Notice: Subject to any disclaimer, the term of this patent is extended or adjusted under 35 U.S.C. 154(b) by 240 days.

(21) Appl. No.: 12/780,903

(22) Filed: May 16, 2010

Related U.S. Application Data

(60) Provisional application No. 61/243,263, filed on Sep. 17, 2009.

(51) Int. Cl.
*H04L 27/06* (2006.01)
*H03D 1/00* (2006.01)

(52) U.S. Cl. ........ 375/341; 375/343; 375/262; 375/265; 714/795; 714/794

(58) Field of Classification Search ............. 375/341, 375/340, 346, 343, 316, 262, 265; 714/795, 714/794
See application file for complete search history.

(56) References Cited

U.S. PATENT DOCUMENTS

| | | | |
|---|---|---|---|
| 6,977,972 B1 | 12/2005 | Kandala et al. | |
| 6,980,602 B1 | 12/2005 | Kleinerman et al. | |
| 7,466,658 B2 * | 12/2008 | Cedergren et al. | 370/252 |
| 7,480,342 B2 | 1/2009 | Wilhelmsson et al. | |
| 7,978,793 B2 | 7/2011 | Anekoji | |
| 2004/0181744 A1 | 9/2004 | Sindhushayana | |
| 2005/0025076 A1* | 2/2005 | Chaudhuri et al. | 370/310 |
| 2009/0060078 A1 | 3/2009 | Van Zelst et al. | |

OTHER PUBLICATIONS

3GPP TS 25.101 "Technical Specification Group Radio Access Network; User Equipment (UE) Radio Transmission and Reception (FDD)", Release 8, version 8.51, Jan. 2009.
Griniasty, M., U.S. Appl. No. 12/612,692 "Calculation of Soft Decoding Metrics", filed May 16, 2010.
3GPP TS 36.211 "Technical Specification Group Radio Access Network; Evolved Universal Terrestrial Radio Access (E-UTRA); Physical Channels and Modulation", Release 8, version 8.6.0, Mar. 2009.
U.S. Appl. No. 12/612,692 Ex Parte Quayle Action dated Jun. 4, 2012.

* cited by examiner

*Primary Examiner* — Phuong Phu

(57) ABSTRACT

A method for communication includes receiving a communication signal conveying multiple encoded bits of an Error Correction Code (ECC). Respective N-bit soft decoding metrics are computed with respect to the bits of the ECC. A scaling factor is computed based on at least one characteristic of the N-bit soft decoding metrics and on at least one property of the received communication signal. The N-bit soft decoding metrics are scaled by the scaling factor. The scaled N-bit soft decoding metrics are quantized to produce respective K-bit metrics, K<N. The ECC is decoded using the scaled and quantized soft decoding metrics.

18 Claims, 3 Drawing Sheets

SCALING AND QUANTIZATION OF SOFT DECODING METRICS

CROSS-REFERENCE TO RELATED APPLICATIONS

This application claims the benefit of U.S. Provisional Patent Application 61/243,263, filed Sep. 17, 2009, whose disclosure is incorporated herein by reference.

FIELD OF THE DISCLOSURE

The present disclosure relates generally to communication systems, and particularly to methods and systems for decoding communication signals.

BACKGROUND

Communication systems often use Error Correction Codes (ECC) to transmit data reliably from a transmitter to a receiver and enable the receiver to decode the data with low error probability. Some communication receivers perform ECC decoding based on soft decoding metrics, such as Log Likelihood ratios (LLRs).

SUMMARY

An embodiment that is described herein provides a method for communication. The method includes receiving a communication signal conveying multiple encoded bits of an Error Correction Code (ECC), and computing respective N-bit soft decoding metrics with respect to the bits of the ECC. A scaling factor is computed based on at least one characteristic of the N-bit soft decoding metrics and on at least one property of the received communication signal. The N-bit soft decoding metrics are scaled by the scaling factor. The scaled N-bit soft decoding metrics are quantized to produce respective K-bit metrics, K<N. The ECC is decoded using the scaled and quantized soft decoding metrics.

In some embodiments, scaling the N-bit soft decoding metrics includes scaling the metrics by a scaling factor that depends on a statistical distribution of Signal-to-Noise Ratios (SNRs) in the received communication signal following equalization. In an embodiment, scaling the N-bit soft decoding metrics includes scaling the metrics depending on a code rate of the ECC. In another embodiment, scaling the N-bit soft decoding metrics includes scaling the metrics depending on a modulation scheme used for modulating the encoded bits in the communication signal. Additionally or alternatively, scaling the N-bit soft decoding metrics includes scaling the metrics depending on at least one parameter selected from a group of parameters consisting of a number of retransmissions used for transmitting the encoded bits, a redundancy version used for transmitting the encoded bits, and an equalization scheme used in receiving the communication signal.

In a disclosed embodiment, receiving the communication signal includes estimating a response of a communication channel over which the signal is received, and scaling the N-bit soft decoding metrics includes scaling the metrics depending on the estimated response. In another embodiment, receiving the communication signal includes receiving a given encoded bit at a given position within a given multi-bit symbol in the signal, and scaling the N-bit metrics includes scaling a respective metric of the given encoded bit depending on the given position of the given encoded bit within the given multi-bit symbol. In yet another embodiment, receiving the communication signal includes receiving signaling information and extracting the property of the communication signal from the signaling information, and the method includes computing the scaling factor based on the extracted property.

In some embodiments, scaling the N-bit soft decoding metrics and decoding the ECC include scaling the metrics using a first scaling factor and attempting to decode the ECC based on the metrics scaled using the first scaling factor; scaling the metrics using a second scaling factor, different from the first scaling factor, and buffering the metrics scaled using the second scaling factor; and, upon a failure to decode the ECC based on the metrics scaled using the first scaling factor, decoding the ECC based on the buffered metrics scaled using the second scaling factor and on a subsequent retransmission of the encoded bits. In an embodiment, quantizing the scaled metrics includes quantizing the metrics scaled using the first scaling factor to a first number of bits, and quantizing the metrics scaled using the second scaling factor to a second number of bits, different from the first number.

There is additionally provided, in accordance with an embodiment that is described herein, communication apparatus that includes digital processing circuitry, a decoder and a computation unit. The digital processing circuitry is configured to receive a communication signal conveying multiple encoded bits of an Error Correction Code (ECC), to compute respective N-bit soft decoding metrics with respects to the bits of the ECC, to scale the N-bit soft decoding metrics by a scaling factor, and to quantize the scaled N-bit soft decoding metrics to produce respective K-bit metrics, K<N. The decoder is configured to decode the ECC using the scaled and quantized soft decoding metrics. The computation unit is configured to compute the scaling factor based on at least one characteristic of the metrics and on at least one property of the received communication signal.

In some embodiments, a mobile communication terminal includes the disclosed communication apparatus. In some embodiments, a chipset for processing signals in a mobile communication terminal includes the disclosed communication apparatus.

The present disclosure will be more fully understood from the following detailed description of the embodiments thereof, taken together with the drawings in which:

DETAILED DESCRIPTION OF EMBODIMENTS

Embodiments that are described hereinbelow provide improved methods and systems for decoding Error Correction Codes (ECC) using soft decoding metrics. In some embodiments, a receiver receives a communication signal that carries multiple encoded bits of an ECC. The receiver computes N-bit soft decoding metrics, such as Log Likelihood Ratios (LLRs), of the received bits. The receiver quantizes the N-bit metrics to produce K-bit metrics, K<N, and stores the quantized K-bit metrics in a buffer. An ECC decoder decodes the ECC using the buffered K-bit metrics.

Before quantizing the N-bit metrics, the receiver scales the N-bit metrics using a scaling factor, which is computed based on a characteristic of the N-bit metrics themselves (typically an average magnitude of the N-bit metrics) and on one or more properties of the received signal. In accordance with an embodiment, properties that are suitable for computing the scaling factor comprise, for example, one or more of: the ECC code rate, the modulation scheme used for modulating the received signal, the statistical distribution of post-equalization Signal-to-Noise Ratios (SNRs) in the received signal, the estimated response of the communication channel over which the signal is received, and/or the equalization scheme used for equalizing the received signal.

In other example embodiments, the receiver computes the scaling factor based on the retransmission number of the signal (e.g., based on whether the signal in question is a second or higher retransmission of an earlier transmission), and/or based on the expected use of the metrics (e.g., whether the metrics are to be decoded or buffered for possible combining with future retransmissions). In some embodiments, LLRs of bits located at different bit positions in a multi-bit symbol are scaled using different scaling factors.

The disclosed techniques apply scaling and quantization to the soft decoding metrics in an adaptive manner, based on the actual properties of the received signal. As a result, the soft decoding metrics can be quantized to a small number of bits with minimal information loss. Subsequent processing, such as buffering and decoding, can be performed using this small number of bits, thus reducing, for example, one or more of memory space requirements, decoder complexity, power consumption and computational power. Several example scaling and quantization schemes are described below. In particular, some of the disclosed schemes can be applied in receivers that use Hybrid Automatic Repeat Request (HARQ) retransmission.

Figure 1:
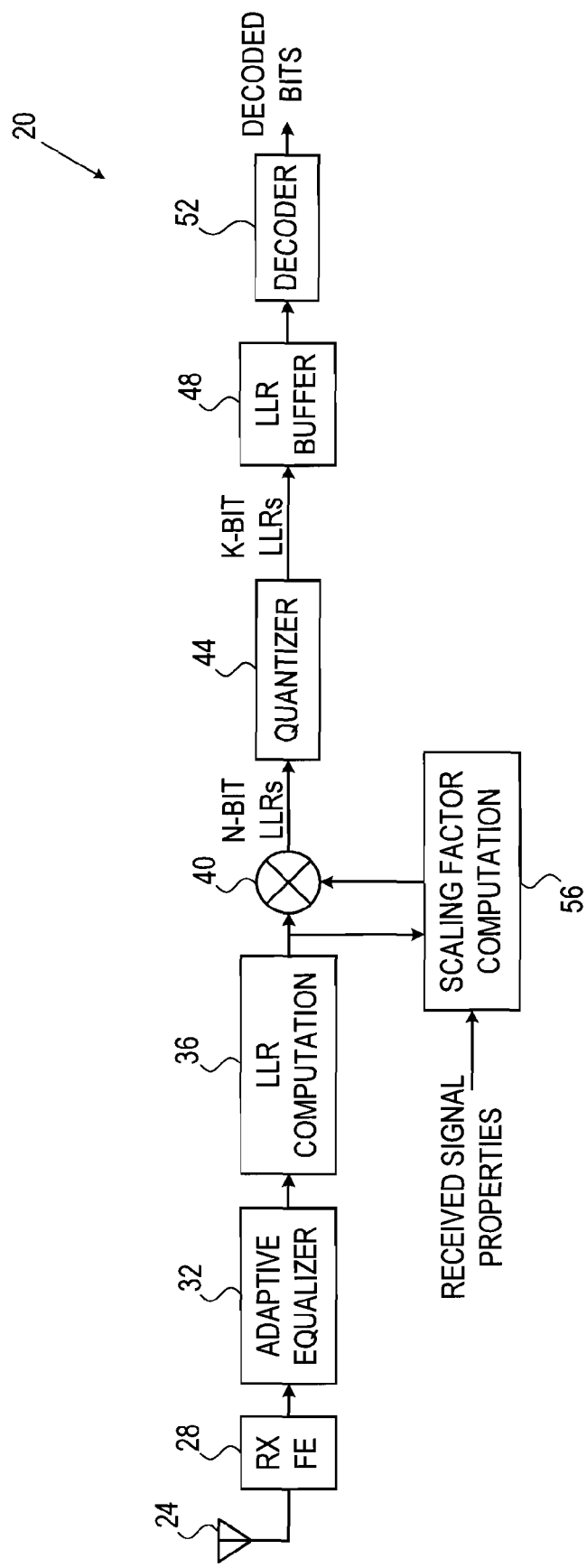
FIG. 1 is a block diagram that schematically illustrates a communication receiver, in accordance with an embodiment that is described herein.

FIG. 1 is a block diagram that schematically illustrates a communication receiver 20, in accordance with an embodiment that is described herein. In the present example, receiver 20 operates in accordance with the Third Generation Partnership Project (3GPP) Evolved Universal Terrestrial Radio Access (E-UTRA) specifications, also referred to as Long Term Evolution (LTE). In this embodiment, receiver 20 may be part of a LTE mobile communication terminal (referred to as User Equipment—UE) or base station (referred to as eNo-deB). In alternative embodiments, however, receiver 20 may operate in accordance with any other suitable communication standard or specification, such as LTE-Advanced (LTE-A) or various Universal Mobile Telecommunications System (UMTS) specifications.

Receiver 20 receives a Radio Frequency (RF) signal from a transmitter (not shown) over a certain wireless communication channel using an antenna 24. A receiver front end (RX FE) 28 down-converts the RF signal to baseband and digitizes the signal to produce a digital baseband signal. In addition to down-conversion, RX FE 28 typically amplifies and filters the received signal, as appropriate. An adaptive equalizer 32 filters the digital baseband signal, so as to compensate for the response of the communication channel.

The signal received by receiver 20 typically comprises a sequence of modulated symbols, e.g., Quadrature Phase Shift Keying (QPSK) symbols, Quadrature Amplitude Modulation (QAM) symbols, or symbols of any other suitable modulation scheme. Each symbol carries one or more bits. The bits carried by the received signal comprise data that was encoded by the transmitter with an Error Correction Code (ECC). In other words, the received signal carries one or more ECC code words, each comprising multiple bits. The received bits are also referred to herein as encoded bits.

Receiver 20 decodes a given ECC code word by computing soft decoding metrics for the received code word bits, and then decoding the code word based on these metrics. The soft decoding metric of a given received bit is typically indicative of the likelihood that the transmitted value of this bit was "0" or "1". In the present example, the soft decoding metrics comprise Log Likelihood Ratios (LLRs) of the received bits, although any other suitable type of soft decoding metrics can also be used.

Receiver 20 comprises a LLR computation unit 36, which computes respective LLR values for the received bits. Typically, LLR computation unit 36 outputs blocks of LLRs, each block corresponding to a certain code word. The LLRs computed by unit 36 are each represented using an N-bit value, and are therefore referred to herein as N-bit LLRs or N-bit metrics. In the present example, N=19, i.e., each LLR is represented using a 19-bit value. In other example embodiments, eight-bit, nine-bit or ten-bit LLRs are used. Further alternatively, any other suitable value of N can be used. In an embodiment, LLR computation unit 36 operates on the equalized symbols produced by equalizer 32. Unit 36 receives as input (1) equalized symbols that carry the bits in question from equalizer 32, (2) channel gain estimates for the symbols, and (3) noise variance estimates for the symbols.

In practice, storing and processing LLRs at high resolution is costly in terms of storage space and computation power. This consideration is especially important in mobile communication terminals. Therefore, in some embodiments, receiver 20 quantizes the N-bit LLRs to produce respective K-bit LLRs, K<N. Subsequent processing (e.g., buffering and decoding) is performed using the K-bit LLRs, often using fixed-point calculations. In the present example, K=5, i.e., the receiver reduces the LLR bit width to five bits. Alternatively, any other suitable value of K can be used.

Quantization of the LLRs often causes some information loss, and may therefore degrade the ECC decoding performance. In order to reduce this degradation, receiver 20 applies scaling to the N-bit LLRs before quantization. In some embodiments, the receiver computes the scaling factor for a given block of N-bit LLRs based on the characteristics of the N-bit LLRs themselves, and on properties of the received signal. Several example methods for computing the scaling factor are described in detail below. In an embodiment, the LLR scaling applied by receiver 20 is variable and adaptive. Adaptive setting of the scaling factor enables the receiver to compress the information conveyed by the LLRs in a manner that depends on various characteristics of the LLRs and various signal properties, so that LLR processing can be optimized while minimizing information loss.

In the embodiment seen in FIG. 1, receiver 20 comprises a digital multiplier 40, which multiplies the N-bit LLRs by the applicable scaling factor. A Quantizer 44 quantizes the scaled N-bit LLRs to produce respective K-bit LLRs. Typically, both the N-bit and K-bit LLRs comprise signed binary numbers, and quantizer 44 quantizes the absolute values of these numbers (such that the numbers retain their signs). Following quantization, the K-bit LLRs are buffered in a LLR buffer 48. (An alternative embodiment having more than one buffer is addressed further below.) An ECC decoder 52 decodes the ECC based on the scaled and quantized K-bit LLRs. In an example embodiment, decoder comprises a Turbo decoder. Alternatively, however, decoder 52 may comprise a Viterbi decoder or any other suitable decoder type. Decoder 52 outputs decoded bits, which reproduce the transmitted data with high likelihood.

Receiver 20 comprises a scaling factor computation unit 56. Unit 56 computes the scaling factor for each block of LLRs, and configures multiplier 40 to apply the appropriate scaling factor. Unit 56 may compute the scaling factor based on various inputs, such as based on characteristics of the N-bit LLRs in the block and various properties of the received signal.

The receiver configuration shown in FIG. 1 is a simplified example configuration, which is depicted for the sake of conceptual clarity. In alternative embodiments, any other suitable receiver configuration can also be used. In some embodiments, receiver 20 is part of a mobile terminal (e.g., LTE UE), and the scaling and quantization schemes described herein are applied in reception of the downlink channel. In alternative embodiments, receiver 20 is part of a base station (e.g., LTE eNodeB), and the scaling and quantization schemes described herein are applied in uplink channel reception.

The different components of receiver 20 may be implemented using dedicated hardware, such as using one or more Application-Specific Integrated Circuits (ASICs) and/or Field-Programmable Gate Arrays (FPGAs). Alternatively, some receiver components (e.g., scaling factor computation unit 56) may be implemented using software running on general-purpose hardware, or using a combination of hardware and software elements. For example, unit 56 may comprise a general-purpose processor, which is programmed in software to carry out the functions described herein, although it too may be implemented on dedicated hardware. The software may be downloaded to the processor in electronic form, over a network, for example, or it may, alternatively or additionally, be provided and/or stored on non-transitory tangible media, such as magnetic, optical, or electronic memory. In some embodiments, some or all of the elements of receiver 20 may be fabricated in a chip-set. Receiver elements that are not mandatory for explanation of the disclosed techniques, such as various RF elements, have been omitted from FIG. 1 for the sake of clarity.

In some embodiments, scaling factor computation unit 56 selects the scaling factor for a given block of LLRs in a manner that reduces or minimizes the error rate (e.g., Block Error Rate—BLER) at the decoder output. An exceedingly high scaling factor may cause large LLR values to clip. An exceedingly low scaling factor, on the other hand, may cause an unnecessarily large modification of small LLR values. In both cases, non-optimal scaling increases information loss, and may therefore degrade the performance of decoder 52 in decoding the ECC. It is noted that the above-mentioned BLER-minimization criterion does not necessarily correspond to minimization of the quantization error. As will be explained and demonstrated below, scaling factor computation of this sort typically considers additional signal properties in addition to the LLR values themselves.

Consider a block of LLRs denoted LLR_SET, which is given by:

$$\text{LLR\_SET} = \bigcup_{i=1}^{I} LLR_i \qquad \text{Equation 1}$$

This LLR block comprises I LLRs, and the $i^{th}$ LLR in the block is denoted $LLR_i$. In some embodiments, the scaling factor selected by unit 56 for the block of LLRs LLR_SET comprises a normalization factor P[LLR_SET], which normalizes the LLRs according to the average magnitude of the LLRs in the block. In an example embodiment, the normalization factor P[LLR_SET] is given by:

$$P[\text{LLR\_SET}] = \left(\frac{1}{I}\sum_{i=1}^{I} LLR_i^r\right)^{\frac{1}{r}} \qquad \text{Equation 2}$$

for some r>0. Alternatively, any other suitable normalization method can also be used.

In addition to the above-described normalization, unit 56 sets the scaling factor as a function of one or more properties of the received signal. This property may comprise, for example, the code rate of the ECC used for encoding the data, the modulation type used for modulating the data, and/or the equalization scheme used by equalizer 32 for equalizing the signal.

Receiver 20 may change the equalization scheme applied by equalizer 32, for example, based on whether or not the signals are transmitted to the receiver using spatial multiplexing. When the transmitter has two or more transmit antennas, for example, it may transmit signals using two or more spatial streams, also referred to as spatial layers. This technique, which is referred to as spatial multiplexing, is used, for example, in some LTE and UMTS systems. In some embodiments, receiver 20 changes the equalization scheme of equalizer 32 depending on whether spatial multiplexing is used or not. In an embodiment, unit 56 selects the LLR scaling factor based on the currently-used equalization scheme. In an example method of considering the equalization scheme, unit 56 may select the scaling factor based on whether the signal is received using spatial multiplexing or not.

In some embodiments, the scaling factor is given by:

$$\text{Scaling} = \frac{f(\text{code rate, modulation and/or equalization})}{P[\text{LLR\_SET}]} \qquad \text{Equation 3}$$

In some embodiments, unit 36 sets the scaling factor as a function of the statistical distribution of Signal-to-Noise Ratios (SNRs) in the symbols that carry the bits over which the LLRs of LLR_SET are computed. The SNRs in this context typically comprise post-equalization SNRs, i.e., SNRs of the equalized symbols produced by equalizer 32.

Let $$\text{SNR\_SET} = \bigcup_{n=1}^{N} SNR_n$$

denote the set of post-equalization SNRs in the symbols in which the bits associated with LLR_SET were transmitted. In some embodiments, such as in LTE systems, the signal is transmitted in certain time-frequency Resource Elements (REs). In these embodiments, SNR SET denotes the set of post-equalization SNRs in the REs over which the bits associated with LLR_SET were transmitted. (In some embodiments, a given RE carries two or more post-equalization symbols, each symbol having a separate respective post-equalization SNR.) Let ρ denote a certain percentage, e.g., 10% or 15%.

Let X denote the ratio between the sum of the largest ρ members of LLR_SET and the sum of the ρ smallest members of LLR_SET:

$$X = \log_{10}\left(\frac{\sum_\rho \text{largest members of SNR\_SET}}{\sum_\rho \text{smallest members of SNR\_SET}}\right) \quad \text{Equation 4}$$

In some embodiments, unit 56 sets the scaling factor for the block LLR_SET based on X, in addition to normalization by P[LLR_SET]:

$$\text{Scaling} = \frac{f(X)}{P[\text{LLR\_SET}]} \quad \text{Equation 5}$$

In alternative embodiments, unit 56 may select the scaling factor based on P[LLR_SET] and any suitable combination of X, the code rate, the modulation scheme and/or the equalization scheme. The mapping between the set {X, code rate, modulation, equalization} (or any subset thereof) to the optimal scaling factor can be determined, for example, by simulation. Such a simulation may decode LLR blocks, after scaling quantization using different scaling factors. The simulation may also compute the value of X for each LLR block. Based on the decoding results, the simulation may then determine the optimal scaling factor for each value of X. Optimality of the scaling factor can be defined using various criteria, such as the scaling factor that provides the minimal block error rate (BLEB).

Computing X according to Equation 4 above typically adds latency to the decoding process. This additional latency may be intolerable in some implementations. In some embodiments, unit 56 computes a running average of the values of X over multiple blocks. The scaling factor is then set based on this average. For example, let $X_n$ denote the value of X computed over the $n^{th}$ LLR block produced at the receiver, and let $\alpha$ denote a constant, $0<\alpha<1$. The running average is given by:

$$Y_n = (1-\alpha) \cdot Y_{n-1} + \alpha \cdot X_{n-1} \quad \text{Equation 6}$$

Unit 56 may set the scaling factor for the $n^{th}$ LLR block based on $Y_n$ instead of X (in addition to normalizing by P[LLR_SET] and possibly in combination with the code rate and modulation, as described above). This technique reduces latency, since $Y_n$ depends on $X_{n-1}$ rather than on $X_n$.

The mapping between the set {$Y_n$, code rate, modulation, equalization} to the optimal scaling factor may be determined, for a given code rate and modulation, by simulation. The simulation may search for the optimal (constant) scaling factor for each type of channel. Then, the simulation may choose a value of $\alpha$ that is small enough, so that the computed value of $Y_n$ is sufficiently different for channels having different optimal (constant) scaling factors. Then, the simulation may compute $Y_n$ for every such channel. Finally, the simulation may determine the mapping between values of $Y_n$ and values of the scaling factor.

Additionally or alternatively, in an embodiment, unit 56 may select the scaling factor for a given LLR block based on the estimated response of the communication channel over which the signal is received.

For example, assume that receiver 20 estimates the channel response by estimating T channel taps, sampled at a frequency denoted sf. The time between two subsequent channel taps is thus 1/sf. let $\{taps_t\}_{t=1}^T$ denote the absolute values of the current estimates of the T channel taps. Unit 56 may select the scaling factor based on a factor Z, which is given by:

$$Z = \frac{\sqrt{\sum_{t=0}^{T-1}\left(\frac{t \cdot taps_t}{sf}\right)^2}}{\sqrt{\sum_{t=0}^{T-1} taps_t^2}} \quad \text{Equation 7}$$

In an embodiment, unit 56 selects the scaling factor based on factor Z, the code rate, the modulation and/or the equalization scheme. The mapping between the set {Z, code rate, modulation, equalization} to the optimal scaling factor may be determined, for a given code rate and modulation, by simulation. The simulation may search for the optimal (constant) scaling factor for each type of channel, compute Z for every such channel type, and then determine the matching between values of Z and values of the scaling factor.

In some embodiments, the received signal comprises a sequence of multi-bit symbols, each multi-bit symbol conveying two or more bits. In many cases, the LLRs of bits located at different bit positions within the respective symbols have different dynamic ranges. Consider, for example, a sequence of 64-QAM symbols (e.g., a 3GPP LTE signal). Each 64-QAM symbol carries six bits. The LLRs of the first bits in the respective symbols of the sequence have a certain dynamic range, whereas the LLRs of the third bits in the respective symbols of the sequence have a different dynamic range. The fifth bits in the respective symbols of the sequence have yet another dynamic range.

In some embodiments, unit 56 selects the scaling factor for the LLR of a given received bit based on the position of this bit within the multi-bit symbol. (An embodiment that is described below differentiates between LLR scaling for purposes of buffering and combining with future retransmissions, and for purposes of decoding. Typically, scaling factor selection based on bit position within the symbol is particularly suitable when the LLRs are scaled for buffering.)

In the above-mentioned 64-QAM example, the LLRs of the first and second bits of the symbols will be scaled by a certain scaling factor, the LLRs of the third and fourth bits of the symbols will be scaled by a different scaling factor, and the LLRs of the fifth and sixth bits of the symbols will be scaled by a yet another scaling factor. (The specific partitioning of the bits is applicable to LTE and UMTS. In other signal types, the ordering of bits in the symbol may be different, and therefore a different partitioning should be used.) This technique takes advantage of the different dynamic ranges of different bit positions, and assigns an optimal scaling factor for each bit position. Note that, unlike in the previous examples, different bits in the block may be assigned different scaling factors.

Applying a different scaling factor to different bit positions can be performed, for example, by selecting scaling factors which have the same numerator but different denominators. The denominators may depend, for example, on the average magnitude of the LLRs corresponding to each bit position in the symbols.

Figure 2:
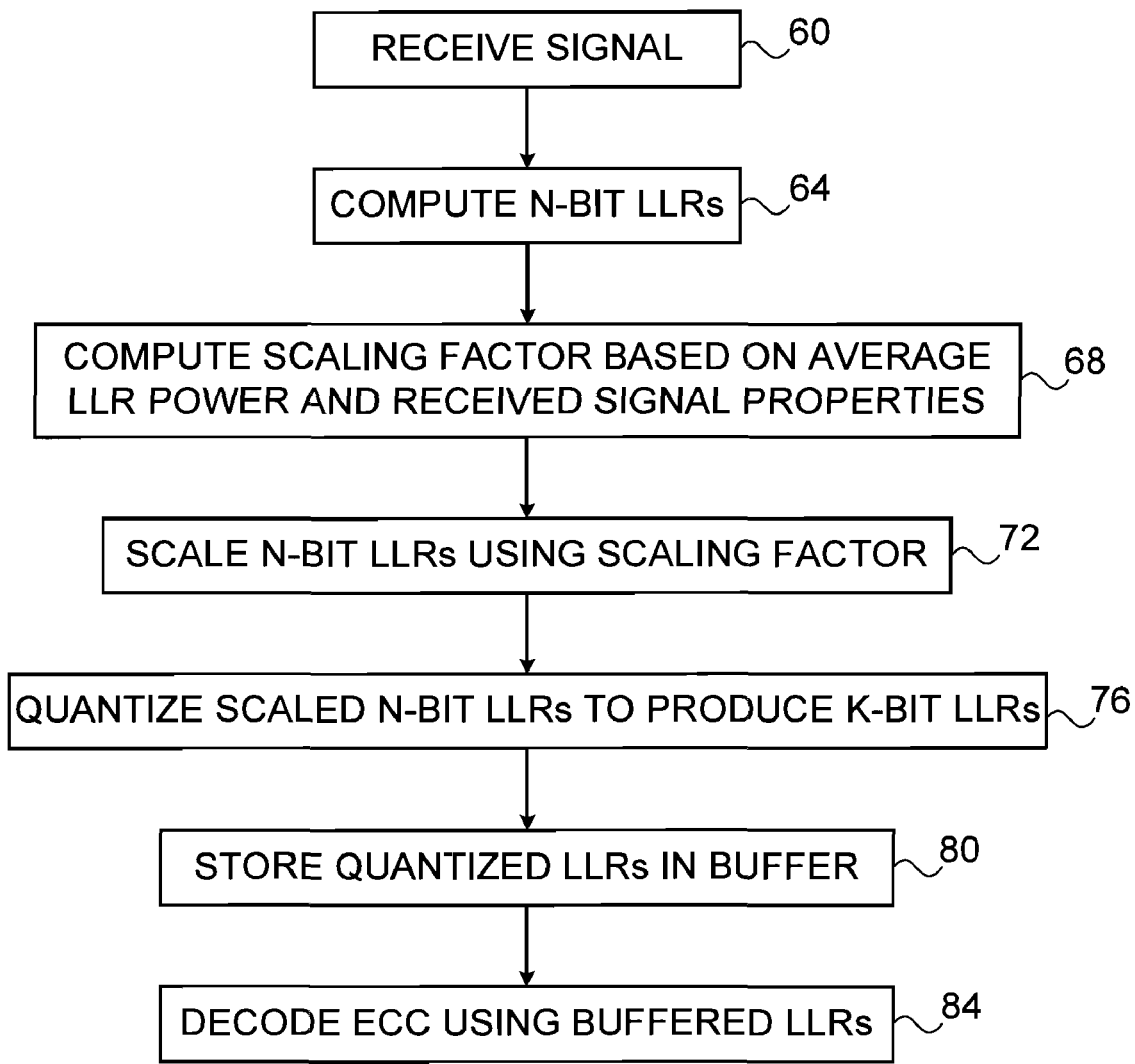
FIG. 2 is a flow chart that schematically illustrates a method for decoding an Error Correction Code (ECC) using scaling and quantizing of soft decoding metrics, in accordance with an embodiment that is described herein.

FIG. 2 is a flow chart that schematically illustrates a method for decoding an Error Correction Code (ECC) using scaling and quantizing of soft decoding metrics, in accordance with an embodiment that is described herein. The method begins at a reception operation 60, with receiver 20 receiving a communication signal that carries ECC-encoded bits. At an LLR computation operation 64, LLR computation unit 36 computes N-bit LLRs for the respective received bits.

At a scaling computation operation 68, scaling factor computation unit 56 computes a scaling factor for a given LLR block. As explained above, unit 56 computes the scaling factor based on a characteristic of the N-bit LLRs (typically the average magnitude of the N-bit LLRs in the block), and on one or more properties of the received signal (such as code rate, modulation scheme, equalization scheme, SNR distribution, bit positions within the symbols, and/or estimated channel taps). Unit 56 configures multiplier 40 with the computed scaling factor.

At a scaling operation 72, multiplier 40 scales the N-bit LLRs in the block by multiplying them with the selected scaling factor. At a quantization operation 76, quantizer 44 quantizes the scaled N-bit LLRs to produce respective K-bit LLRs. At a buffering operation 80, the scaled and quantized K-bit LLRs are buffered in LLR buffer 48. At a decoding operation 80, decoder 52 decodes the ECC based on the buffered K-bit LLRs. The decoded bits are provided as output of the receiver.

In some embodiments, unit 56 extracts one or more of the received signal properties from signaling information, which is transmitted from the transmitter to the receiver. For example, the currently-used code rate and modulation may be transmitted to the receiver using signaling messages. Unit 56 may extract the code rate and modulation from the received signaling information, and compute the scaling factor using these extracted properties.

In some embodiments, receiver 20 is part of a communication system that applies Hybrid Automatic Repeat Request (HARQ) retransmission. In this mechanism, the transmitter transmits a certain data block encoded with ECC. The receiver computes the LLRs of the bits of this data block, buffers them and attempts to decode the ECC. If decoding fails, the receiver requests the transmitter to retransmit the same encoded data block. The receiver computes the LLRs of the bits of the retransmitted data block, combines them with the respective buffered LLRs of the initially-transmitted block, and attempts to decode the ECC again. In the second decoding attempt, the LLR of the $i^{th}$ bit comprises a combination of two LLRs—one computed for the $i^{th}$ bit in the initial transmission of the block and one computed for the $i^{th}$ bit in the retransmitted block. The HARQ process can be repeated for two or more retransmission attempts. (Note that the ECC code rate often differs between the initially-transmitted block and the retransmitted block.)

In some protocols, such as LTE and UMTS, each HARQ transmission specifies a certain Redundancy Version (RV). The RV of a given transmission indicates which code bits are transmitted at that transmission. When carrying out LLR quantization, the receiver is aware of the RVs of the current HARQ transmission and any previous HARQ transmissions of the same block. In some embodiments, receiver 20 selects the LLR scaling factor for a given transmission based on the HARQ transmission number (i.e., whether the current transmission is the first transmission of the block, second transmission of the block, etc.), and/or on the RV of the transmission.

Figure 3:
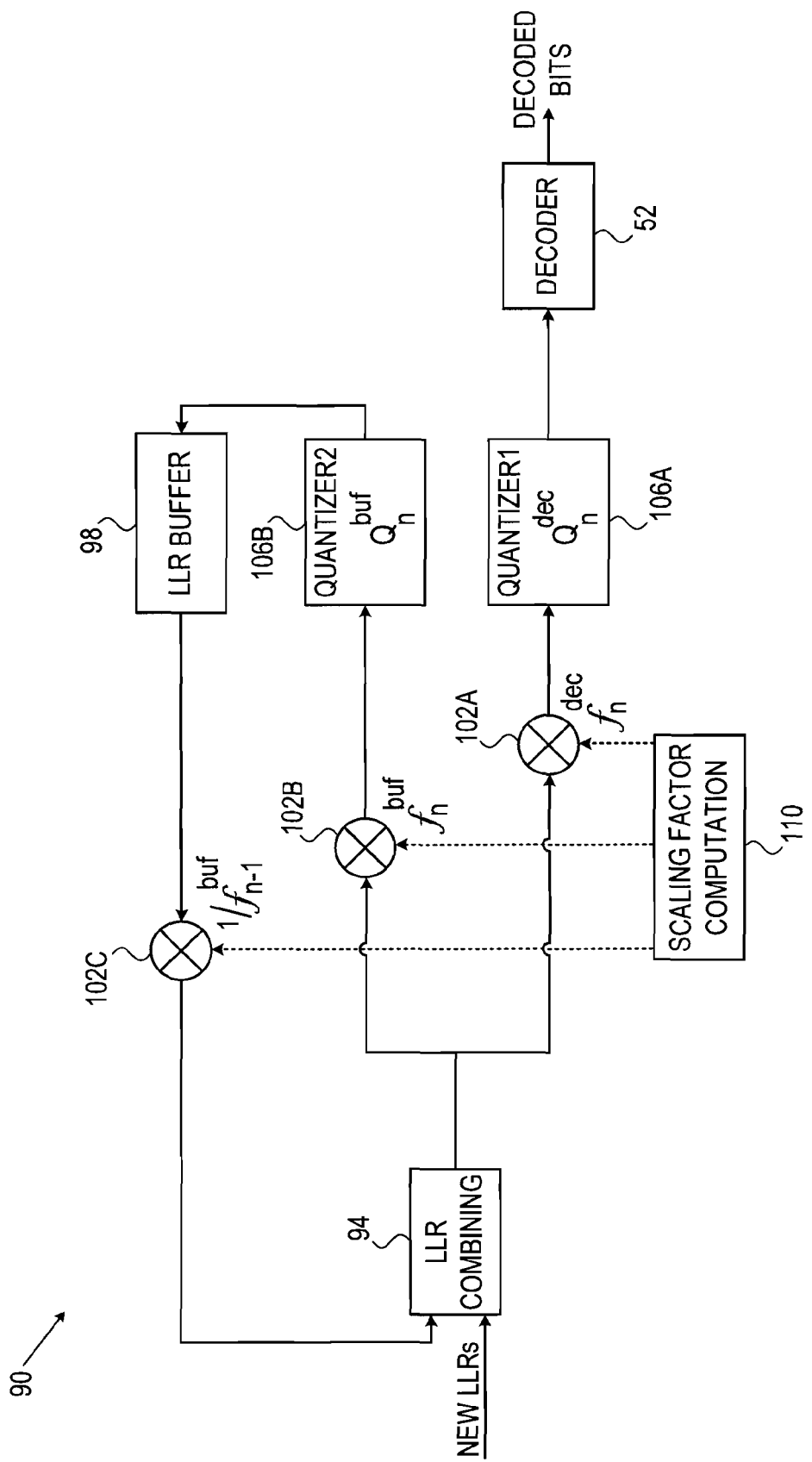
FIG. 3 is a block diagram that schematically illustrates a communication receiver, in accordance with an alternative embodiment that is described herein.

FIG. 3 is a block diagram that schematically illustrates a communication receiver 90, in accordance with an alternative embodiment that is described herein. The LLR scaling and quantization performed in receiver 90 are particularly suitable for HARQ retransmission schemes. Some receiver elements, such as the antenna, front end, equalizer and LLR computation unit, for example, have been omitted from the figure for the sake of clarity.

Receiver 90 comprises an LLR combining unit 94, which combines LLRs of a previously-transmitted block with corresponding LLRs of a retransmitted block. The LLRs of the previously-transmitted block are buffered in an LLR buffer 98. The LLRs of the retransmitted block, accepted from the LLR computation module, are denoted "NEW LLRs" in the figure.

In the present example, each LLR produced by unit 94 is scaled and quantized using two different sets of scaling factors and quantization factors. A multiplier 102A scales the LLRs of the $n^{th}$ block produced by unit 94 by a scaling factor $f_n^{dec}$. A first quantizer 106A quantizes the LLRs of the $n^{th}$ block at the output of multiplier 102A to a number of bits denoted $Q_n^{dec}$. The scaled and quantized LLRs produced by first quantizer 106A are provided to decoder 52 for decoding. The values of $f_n^{dec}$ and $Q_n^{dec}$ are chosen so as to provide optimal ECC decoding performance.

In addition, a multiplier 102B scales the LLRs of the $n^{th}$ block produced by unit 94 by a scaling factor $f_n^{buf}$. A second quantizer 106B quantizes the LLRs of the $n^{th}$ block at the output of multiplier 102B to a number of bits denoted $Q_n^{buf}$. The scaled and quantized LLRs produced by quantizer 106B are buffered in LLR buffer 98, in order to combine them with respective LLRs of a subsequent retransmission if necessary. The values of $f_n^{buf}$ and $Q_n^{buf}$ may generally differ from the values of $f_n^{dec}$ and $Q_n^{dec}$ respectively. The values of $f_n^{buf}$ and $Q_n^{buf}$ are chosen so as to allow combining of the LLRs with subsequent retransmissions. It is noted that scaling and quantization factors that are optimal for decoding may not be optimal for combining with future retransmitted LLRs. For example, the ECC code rate after soft-combining two or more HARQ transmissions is lower than or equal to the ECC code rate of the first HARQ transmission. Thus, the effective code rate of the LLRs at the decoder input, after soft combining, decreases (or at least does not increase) with each additional HARQ transmission. The values of the scaling factor and quantization factor can be chosen to best match the code rate in question. Typically, a higher code rate corresponds to a larger scaling factor, and vice versa.

When a given block is retransmitted, the LLR computation unit computes the LLRs of the bits of the retransmitted block ("NEW LLRs"). Unit 94 is to combine the newly-arriving LLRs with the corresponding LLRs of the previously-transmitted $(n-1^{th})$ block buffered in buffer 98. In order to bring the two sets of LLRs to a common scale, a multiplier 102C scales the buffered LLRs by a scaling factor $1/f_{n-1}^{buf}$. The output of multiplier 102C is provided as input to unit 94, in parallel to the new LLRs arriving from the LLR computation unit. A scaling factor computation unit computes the different scaling factors, and configures multipliers 102A . . . 102C accordingly. In some embodiments, unit 110 may also set the values of $Q_n^{dec}$ and $Q_n^{buf}$ in quantizers 106A and 106B.

In some embodiments, the future code rate that will be used in subsequent retransmissions is already known at the time $f_n^{buf}$ is set. In these embodiments, the value of $f_n^{buf}$ can be selected while considering the future code rate. In other embodiments, the future code rate used in subsequent retransmissions is not known a-priori. In these embodiments, the quantization factor $Q_n^{buf}$ can be increased so as to improve the performance of future LLR combining. $Q_n^{buf}$ may be set dynamically, for example based on the retransmission number (e.g., first or second retransmission), the number of LLRs in the block, or any other suitable criterion.

As noted above, in some embodiments the scaling factor for the LLR of a given bit is selected based (at least in part) on the bit's position in the symbol. When using the HARQ configuration of receiver 90, unit 110 may define different values of $f_n^{buf}$ for different bit positions. For LTE 64-QAM symbols, for example, unit 110 may apply three $f_n^{buf}$ values:

one value for the first and second bits in each symbol, another value for the third and fourth bit is each symbol, and yet another value for the fifth and sixth bits in each symbol. The multipliers and quantizer in FIG. 3 may have to be duplicated multiple times for this purpose.

The signal properties that are used for scaling factor calculation in the embodiments described herein are depicted solely by way of example. In alternative embodiments, unit 56 and unit 110 may compute the scaling factor based on any other suitable signal property. Although the embodiments described herein mainly address LTE and UMTS systems, the methods and systems described herein can also be used in any other communication system that decodes ECC using soft decoding of soft metrics, such as WiFi systems or Ethernet systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
receiving in a receiver a communication signal conveying multiple encoded bits of an Error Correction Code (ECC), wherein the communication signal comprises a given multi-bit symbol comprising a given encoded bit at a given position within the given multi-bit symbol;
computing by the receiver respective N-bit soft decoding metrics with respect to the bits of the ECC;
computing by the receiver a scaling factor that is based on at least one characteristic of the N-bit soft decoding metrics and on at least one property of the received communication signal;
scaling the N-bit soft decoding metrics in the receiver by the scaling factor, including scaling a respective metric of the given encoded bit depending on the given position of the given encoded bit within the given multi-bit symbol;
quantizing the scaled N-bit soft decoding metrics by the receiver to produce respective K-bit metrics, K<N; and
decoding the ECC in the receiver using the scaled and quantized soft decoding metrics.

2. The method according to claim 1, wherein scaling the N-bit soft decoding metrics comprises scaling the metrics by a scaling factor that depends on a statistical distribution of Signal-to-Noise Ratios (SNRs) in the received communication signal following equalization.

3. The method according to claim 1, wherein scaling the N-bit soft decoding metrics comprises scaling the metrics depending on a code rate of the ECC.

4. The method according to claim 1, wherein scaling the N-bit soft decoding metrics comprises scaling the metrics depending on a modulation scheme used for modulating the encoded bits in the communication signal.

5. The method according to claim 1, wherein scaling the N-bit soft decoding metrics comprises scaling the metrics depending on at least one parameter selected from a group of parameters consisting of a number of retransmissions used for transmitting the encoded bits, a redundancy version used for transmitting the encoded bits, and an equalization scheme used in receiving the communication signal.

6. The method according to claim 1, wherein receiving the communication signal comprises estimating a response of a communication channel over which the signal is received, and wherein scaling the N-bit soft decoding metrics comprises scaling the metrics depending on the estimated response.

7. The method according to claim 1, wherein receiving the communication signal comprises receiving signaling information and extracting the property of the communication signal from the signaling information, and comprising computing the scaling factor based on the extracted property.

8. A method for communication, comprising:
receiving in a receiver a communication signal conveying multiple encoded bits of an Error Correction Code (ECC);
computing by the receiver respective N-bit soft decoding metrics with respect to the bits of the ECC;
computing by the receiver a scaling factor that is based on at least one characteristic of the N-bit soft decoding metrics and on at least one property of the received communication signal;
scaling the N-bit soft decoding metrics in the receiver by the scaling factor;
quantizing the scaled N-bit soft decoding metrics by the receiver to produce respective K-bit metrics, K<N; and
decoding the ECC in the receiver using the scaled and quantized soft decoding metrics,
wherein scaling the N-bit soft decoding metrics and decoding the ECC comprise:
scaling the metrics using a first scaling factor and attempting to decode the ECC based on the metrics scaled using the first scaling factor;
scaling the metrics using a second scaling factor, different from the first scaling factor, and buffering the metrics scaled using the second scaling factor; and
upon a failure to decode the ECC based on the metrics scaled using the first scaling factor, decoding the ECC based on the buffered metrics scaled using the second scaling factor and on a subsequent retransmission of the encoded bits.

9. The method according to claim 8, wherein quantizing the scaled metrics comprises quantizing the metrics scaled using the first scaling factor to a first number of bits, and quantizing the metrics scaled using the second scaling factor to a second number of bits, different from the first number.

10. A communication apparatus, comprising:
digital processing circuitry, which is configured to receive a communication signal conveying multiple encoded bits of an Error Correction Code (ECC), wherein the communication signal comprises a given multi-bit symbol comprising a given encoded bit at a given position within the given multi-bit symbol, to compute respective N-bit soft decoding metrics with respects to the bits of the ECC, to scale the N-bit soft decoding metrics by a scaling factor, including scaling a respective metric of the given encoded bit depending on the given position of the given encoded bit within the given multi-bit symbol, and to quantize the scaled N-bit soft decoding metrics to produce respective K-bit metrics, K<N;
a decoder, which is configured to decode the ECC using the scaled and quantized soft decoding metrics; and
a computation unit, which is configured to compute the scaling factor based on at least one characteristic of the metrics and on at least one property of the received communication signal.

11. The apparatus according to claim 10, wherein the digital processing circuitry is configured to scale the metrics by a scaling factor that depends on a statistical distribution of Signal-to-Noise Ratios (SNRs) in the received communication signal following equalization.

12. The apparatus according to claim 10, wherein the digital processing circuitry is configured to scale the metrics depending on a code rate of the ECC.

13. The apparatus according to claim 10, wherein the digital processing circuitry is configured to scale the metrics depending on a modulation scheme used for modulating the encoded bits in the communication signal.

14. The apparatus according to claim 10, wherein the digital processing circuitry is configured to estimate a response of a communication channel over which the signal is received, and to scale the metrics depending on the estimated response.

15. The apparatus according to claim 10, wherein the digital processing circuitry is configured to extract the property of the communication signal from received signaling information, and to compute the scaling factor based on the extracted property.

16. A communication apparatus, comprising:

digital processing circuitry, which is configured to receive a communication signal conveying multiple encoded bits of an Error Correction Code (ECC), to compute respective N-bit soft decoding metrics with respects to the bits of the ECC, to scale the N-bit soft decoding metrics by a scaling factor, and to quantize the scaled N-bit soft decoding metrics to produce respective K-bit metrics, K<N;

a decoder, which is configured to decode the ECC using the scaled and quantized soft decoding metrics; and a computation unit, which is configured to compute the scaling factor based on at least one characteristic of the metrics and on at least one property of the received communication signal, wherein the digital processing circuitry and the decoder are configured to scale the N-bit soft decoding metrics and decode the ECC by:

scaling the metrics using a first scaling factor and attempting to decode the ECC based on the metrics scaled using the first scaling factor;

scaling the metrics using a second scaling factor, different from the first scaling factor, and buffering the metrics scaled using the second scaling factor; and upon a failure to decode the ECC based on the metrics scaled using the first scaling factor, decoding the ECC based on the buffered metrics scaled using the second scaling factor and on a subsequent retransmission of the encoded bits.

17. A mobile communication terminal comprising the communication apparatus of claim 10.

18. A chipset for processing signals in a mobile communication terminal, comprising the communication apparatus of claim 10.

* * * * *